United States Patent [19]

Collonia

[11] 4,161,994

[45] Jul. 24, 1979

[54] SPEED REGULATING DEVICE FOR MOTOR VEHICLES

[75] Inventor: Harald Collonia, Königstein, Fed. Rep. of Germany

[73] Assignee: VDO Adolf Schindling AG, Frankfurt am Main, Fed. Rep. of Germany

[21] Appl. No.: 881,679

[22] Filed: Feb. 27, 1978

[30] Foreign Application Priority Data

Mar. 3, 1977 [DE] Fed. Rep. of Germany ....... 2709164

[51] Int. Cl.² ............................................. B60J 23/00
[52] U.S. Cl. ..................................... 180/179; 123/102
[58] Field of Search ............... 180/105 R, 105 E, 109, 180/110; 123/102

[56] References Cited

U.S. PATENT DOCUMENTS

| 3,207,255 | 9/1965 | Hahlganss et al. ............... | 180/105 R |
| 3,983,767 | 10/1976 | Lefeuvre ........................... | 180/105 X |

Primary Examiner—Joseph F. Peters, Jr.
Assistant Examiner—Michael Mar
Attorney, Agent, or Firm—Otto John Munz

[57] ABSTRACT

A speed regulating device for motor vehicles, wherein a setting element is arranged to affect the fuel/air mixture supplied to the engine of the vehicle in response to a control signal, and including an electrical regulator and a variable resistor associated with the setting element and the electrical regulator for signalling to the electrical regulator the actual position of the setting element, the feedback means including a lost motion connection whereby a predetermined movement of the setting element is required before an indication of change or reversal of movement of the setting element is communicated to the electrical regulator, thereby eliminating hunting of the speed regulating device caused by looseness or play in mechanical linkage between the setting drive and throttle valve.

6 Claims, 2 Drawing Figures

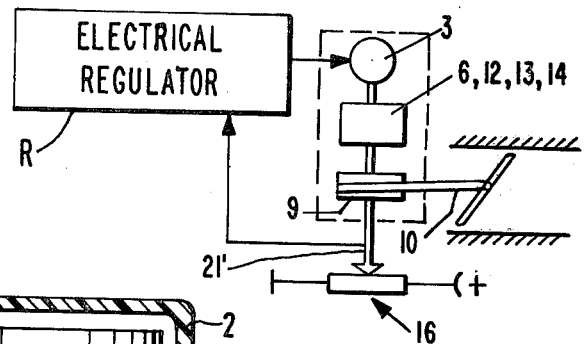
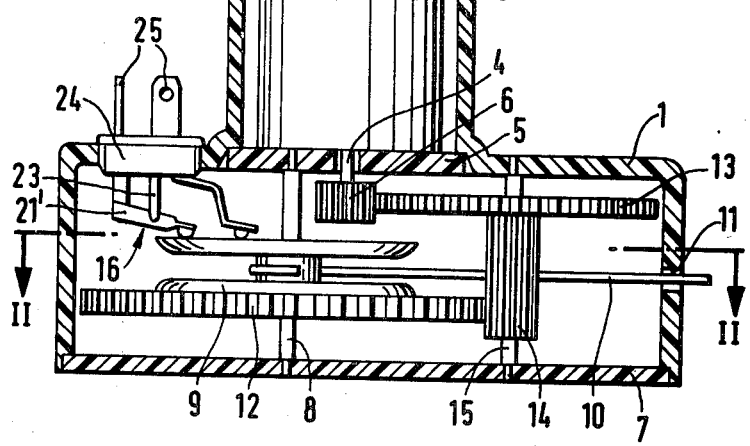
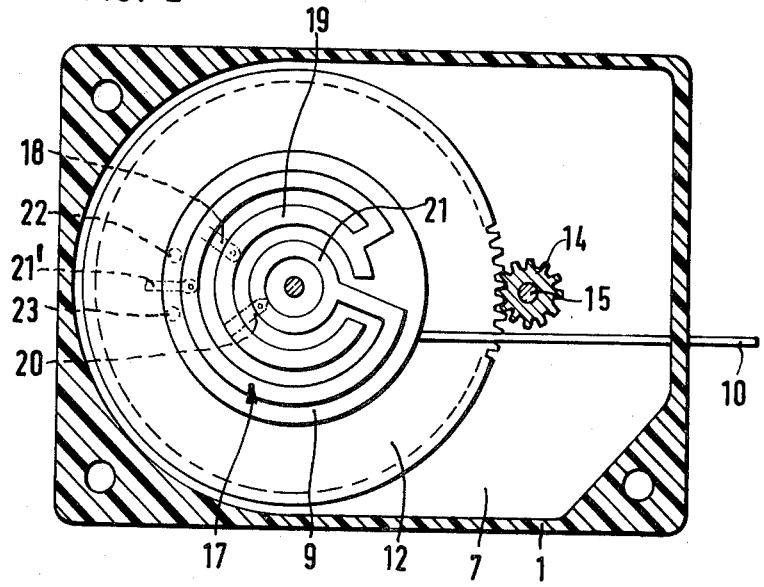

SPEED REGULATING DEVICE FOR MOTOR VEHICLES

The invention relates to a speed regulating device for motor vehicles, comprising an electric regulator that produces a control signal dependent on the deviation between the actual speed and the desired speed, and an adjusting device acted upon by the control signal and provided with a setting element that affects the fuel/air mixture, wherein particularly an element acting upon the throttle valve, the prevailing position of the setting element is detected by a variable resistor with a movable pad and a stationary part and is re-communicated to the regulator.

BACKGROUND OF THE INVENTION

In known devices of this type, speed variations of several km/h occur in regulated travel. In other words, the vehicle does not move, as desired, at a constant speed but at a speed that varies about an average value. This effect results essentially from the play of the mechanical elements between the setting drive and the throttle valve, which only in a very few vehicles that are provided with a favorable arrangement of the throttle control rod, and at a substantial expense for manufacture and assembly, can be reduced to a tolerable amount. On account of this considerable expense, a certain swinging of the actual speed about an average value in the regulated state has hitherto, even in these vehicles, always been accepted.

SUMMARY OF THE INVENTION

An object of the invention is, therefore, to provide means for eliminating speed variations of the kind described above in the regulated state. Moreover, another object of the invention is to provide such means without great expenses.

According to the invention, this problem is solved with a basic apparatus as described above, but with the addition of a structure wherein the stationary part of the variable resistor is fixed so as to be elastically movable to a specific extent in the direction of motion of the movable part, and is connected with the movable part in frictional engagement, in such a manner that when the movable parts moves, the stationary part is carried along to a limited extent.

With the structure of the invention, the result is achieved that upon a reversal of movement of the setting element, feed back of such reversal movement to the electric control circuit or regulator takes place only after the setting element has moved through a prespecified distance. Thus, the dead path or lost motion resulting from the play of the mechanical parts between the setting drive and the throttle valve is unobjectionably eliminated. A special advantage of the invention is that the measures can be implemented at an extremely small expense.

In the speed regulating device of the invention, a variable resistor comprising a stationary slider and a movable impedance element, has the slider resilient in the direction of motion of the movable part, and on both sides of the slider, stops for limiting its deflection are provided. This has the particular advantage that the expense necessary for this embodiment is particularly small.

The invention will be explained in greater detail with the aid of the drawing, which contains in partly diagrammatic illustration a preferred embodiment.

BRIEF DESCRIPTION OF THE DRAWINGS

FIG. 1 is a side view in partial section of a setting element of the speed regulating device;

FIG. 2 is a sectional view through the setting element of FIG. 1, along line II—II.

FIG. 3 is a diagrammatic view of the speed regulating device of the invention.

DETAILED DESCRIPTION OF THE PREFERRED EMBODIMENT

The speed regulating device of the invention includes a casing 1 with an upstanding cylindrical extension 2 in which a d.c. motor 3 is mounted. The shaft 4 of the motor 3 projects through an opening in a cover plate or member 5 secured across the open lower end of cylindrical extension 2, and a pinion 6 is secured on the lower end of the shaft.

The casing 1 has an open bottom side closed by a cover 7, and a shaft 8 is supported at its opposite ends in the covers 5 and 7, respectively. A cable pulley or setting element 9 is supported on the shaft 8 for winding and unwinding a setting element cable 10 connected at one end to the pulley.

The cable 10 extends through an opening 11 in the casing 1 and is connected to the throttle control rod (not shown) of the motor vehicle.

Motor 3 is controlled by an electric regulator, R which may be of conventional structure.

A gear wheel 12 is carried by the pulley, and may be molded with the pulley, if desired. The gear wheel 12 is driven by motor 3 and pinion 6 via gear wheels 13 and 14 meshed, respectively, with pinion 6 and gear wheel 12, and carried by a spindle or shaft 15 supported at its opposite ends in the top wall of casing 1 and in the cover 7 thereof.

A variable resistor 16, provided for the achievement of a proportional regulation, consists of an impedance path 17 which is connected, on one side, via a slider 18 and a contact path 19, and on the other side via a slider 20 and a contact path 21, to the operating voltage. Impedance path 17 and contact paths 19 and 21 are printed or pasted upon a front surface of cable pulley 9.

The slider 21' serves as an impedance tap, and is shaped as a leaf spring which extends with its leaf surface perpendicularly to the front surface of cable pulley 9 and is biased against impedance path 17 so that upon rotational motion of cable pulley 9 it is carried along therewith until it abuts against one or the other of the two stops 22 or 23, depending upon the direction of rotation.

Sliders 18, 20, and 21' are mounted, like stops 22 and 23 in a support 24 which is inserted in a corresponding recess in casing 1. On its outside, the supports are provided with connecting lugs 25 for connecting the individual sliders to the regulating circuit (not shown).

The wiring of the setting element in the speed regulating device can be carried out in a known manner. Reference is made, e.g., to the Deutsche Auslegeschrift (German laying open document) No. 12 14 103 which contains an applicable circuit.

I claim:

1. In a motor vehicle speed regulating device having an adjusting device with a movable setting element for connection to a throttle valve of an engine to adjust the air/fuel mixture and thereby adjust the speed of the engine, and an electrical regulator for comparing a reference signal representative of a desired speed and a signal representative of actual speed and detecting a deviation therebetween and producng a control signal dependent on the deviation, and connected with the setting element to cause movement of the setting element in response to a detected deviation, the improvement comprising variable impedance means carried by the setting element and including movable electrical contact means for producing a changed impedance dependent upon a changed position of the setting element and conducting the changed impedance to the electrical regulator, said variable impedance means including a lost motion means whereby the setting element must move a predetermined extent before a changed impedance is produced, thereby avoiding oscillation or hunting of the speed regulating device.

2. In a speed regulating device for motor vehicles, wherein a movable setting element is connected to affect the fuel/air mixture supplied to the engine of the vehicle in response to a control signal, and including an electrical regulator with means for producing signals representative of the actual speed and the desired seed, respectively, and for detecting a deviation therebetween and producing a control signal in dependance upon the deviation, and an impedance means connected with the setting element and electrical regulator for communicating to the electrical regulator an impedance indicative of the position of the setting element, the improvement comprising variable impedance means carried by the setting element and including movable electrical contact means for producing a changed impedance dependent upon a changed position of the setting element, said variable impedance means including a lost motion means whereby the setting element must move a predetermined extent before a changed impedance is produced and communicated to the electrical regulator, thereby avoiding oscillation or hunting of the speed regulating device.

3. A speed regulating device for motor vehicles as claimed in claim 2, wherein the variable impedance means includes a movable part carried by the setting element, and a stationary part, said stationary part comprising said electrical contact means and being resiliently biased into frictional contact with said movable part and movable to a predetermined extent in the direction of motion of the movable part so that when the movable part moves, the stationary part is carried along to a limited extent.

4. A speed regulating device as claimed in claim 3, wherein limit stops are in position to engage and stop the stationary part after predetermined movement thereof.

5. A speed regulating device for motor vehicles as claimed in claim 2, wherein the device includes
 a casing,
 an electric motor supported in the casing, said electric motor having a drive means, driven means connected to be driven by the drive means,
 said variable impedance means connected with the driven means to be driven therewith, and
 said setting element movable means connected with said driven means for movement therewith.

6. A speed regulating device for motor vehicles as claimed in claim 5, wherein the impedance means includes
 a movable member and stationary sliders engaged therewith, one of said sliders being mounted for predetermind limited movement with the movable member, whereby the movable member moves through a predetermined distance before a change is produced in the impedance.

* * * * *